(12) United States Patent
Sikora (10) Patent No.: US 8,028,535 B2
(45) Date of Patent: Oct. 4, 2011

(54) SYSTEM FOR EFFICIENT FLUID DEPRESSURISATION

(75) Inventor: Paul Sikora, Rosscarbery (IE)

(73) Assignee: Thermonetics Ltd., Dublin (IE)

( * ) Notice: Subject to any disclaimer, the term of this patent is extended or adjusted under 35 U.S.C. 154(b) by 0 days.

(21) Appl. No.: 12/683,661

(22) Filed: Jan. 7, 2010

(65) Prior Publication Data

US 2010/0314074 A1    Dec. 16, 2010

(30) Foreign Application Priority Data

Jun. 11, 2009  (EP) .................................. 09162513

(51) Int. Cl.
  *F25B 13/00*  (2006.01)
  *F25D 17/02*  (2006.01)
(52) U.S. Cl. ................ 62/160; 62/185; 62/201; 60/647; 165/104.11
(58) Field of Classification Search .............. 62/87, 160, 62/185, 201, 238.4; 60/498, 643, 647, 682; 165/104.11
See application file for complete search history.

(56) References Cited

U.S. PATENT DOCUMENTS

| 4,184,325 A | 1/1980 | Mandrin |
| 4,231,226 A | 11/1980 | Griepentrog |
| 4,475,343 A | 10/1984 | Dibelius et al. |
| 4,677,827 A | 7/1987 | Shenoy et al. |
| 5,628,191 A | 5/1997 | Kueck et al. |
| 5,685,154 A * | 11/1997 | Bronicki et al. ............... 60/648 |
| 2001/0048031 A1 * | 12/2001 | Noro et al. .................... 237/2 B |
| 2003/0172661 A1 | 9/2003 | Yaroslavovich et al. |

FOREIGN PATENT DOCUMENTS

| DE | 2523672 A1 | 12/1976 |
| DE | 2743918 A1 | 6/1978 |
| DE | 4416359 A1 | 11/1995 |
| DE | 10246170 A1 | 4/2004 |
| DE | 102006046246 A1 | 2/2008 |
| EP | 0039907 A1 | 11/1981 |
| WO | 2008/071008 A1 | 6/2008 |

OTHER PUBLICATIONS

Pozivil, Jaroslav, "Use of Expansion Turbines in Natural Gas Pressure Reduction Stations," Acta Montanistica Slovaca, Rocnik 9, 2004, Cislo 3, pp. 258-260.
Search Report of European Patent Application 09 16 2513.7 mailed Oct. 22, 2009.

* cited by examiner

*Primary Examiner* — Marc E Norman
(74) *Attorney, Agent, or Firm* — Summa, Addition & Ashe, P.A.

(57) ABSTRACT

The present invention relates to a system for depressurisation of high pressure pipeline fluids. The system may provide for net power generation without the pressurised fluid undergoing liquefaction or solidification or unacceptable temperature reduction as a result of a Joule-Thompson process. The system is particularly relevant for depressurising high pressure natural gas pipelines in an energy efficient manner whilst making possible net power generation. The system for depressurisation of a pressurised fluid in a pipeline comprises at least one depressuriser for expanding the fluid in the pipeline to a lower pressure; and a transcritical heat pump for circulating a supercritical fluid, wherein the supercritical fluid undergoes cooling so as to release heat for transmission to the pressurised fluid in the pipeline prior to at least one expansion of said pressurised fluid.

20 Claims, 4 Drawing Sheets

SYSTEM FOR EFFICIENT FLUID DEPRESSURISATION

FIELD OF THE INVENTION

The present invention relates to a system for providing efficient depressurising of high pressure pipeline fluids. The system may provide for net power generation without the fluid undergoing liquefaction, solidification or unacceptable temperature reduction as a result of a Joule-Thompson process. The system is particularly relevant for depressurising high pressure natural gas pipelines in an energy efficient manner whilst making possible net power generation.

BACKGROUND TO THE INVENTION

Natural gas is transmitted via high pressure pipelines and distributed to end users at considerably lower pressures. Generally, compressor stations are used to raise the pressure and to maintain it during long distance transmission. It is noteworthy that differing line pressures are used for transmission lines in differing geographical settings, and the pressures must be reduced accordingly in compliance with network design requirements in a varying number of steps, which depend upon the size and nature of the end user or subdistribution node on the system.

The process of pressure reduction is normally accomplished by means of a small orifice or throttling valve and results in a substantial lowering of the gas' temperature. Naturally, the extent of temperature drop is directly proportional to the extent of pressure reduction that occurs.

Temperature drop caused by Joule-Thompson processes is undesirable and must be avoided, or at least limited for a number of reasons. Excessive chilling can cause undesirable stresses in the pipes and ancillary equipment; it can degrade certain pipe coatings and pipe materials; it can also cause freezing of the earth surrounding the pipeline with the associated risk of frost heave. Furthermore, the gas itself may contain condensable components whose liquefaction or solidification in reduced temperatures may pose problems for the downstream network.

The most direct method for avoiding such problems is to heat the gas stream immediately before its pressure is reduced. The amount of heat delivered is controlled so that the post-expansion gas temperature remains high enough to circumvent low temperature problems upon pressure release.

Burning a portion of the gas represents a logical source of heat available to the natural gas pressure reduction station. Unless there is another reliable and uninterrupted source of heat available to the pressure reduction station, a bank of high efficiency gas fired boilers is usually deployed to provide the necessary heat. This remedy is effective and generally straightforward to implement, but it comes at the cost of consuming some of the deliverable energy in the gas. Proposals have been made to use fuel cells or combined heat and power (CHP) units rather than boilers to supply heat along with power, but the energy loss in terms of gas consumption still remains.

Prior art methods for reducing or eliminating the waste of energy in the process of pressure reduction in natural gas are described below.

U.S. Pat. No. 4,677,827 describes adding an inhibitor to the gas upstream of the pressure reduction. The purpose of the inhibitor is to prevent condensation in the chilled gas. After the inhibitor is added the pressure reduction is allowed to take place without preheating.

Reheating after pressure reduction can be accomplished by establishing thermal contact with the ambient since the expanded gas will generally have a temperature below ambient. This can be done in a number of ways. For example: by providing free refrigeration to an available load (provided that such a load can be found); by providing a direct or indirect heat exchange connection between the gas and the ambient or by supplementing passive heat exchange with heat supplied by a heat pump. These methods allow much if not all of the reheating to be supplied from the ambient, with a consequent saving in heat produced by gas burning.

Difficulties with this approach include the necessity to provide an additional consumable, i.e. the inhibitor, to each site and to meter its injection into the gas stream. In addition it may be necessary to recover the inhibitor before the gas is supplied to the end user. Recovery of the inhibitor entails additional equipment and adds materially to the complexity of the station and to its operation.

Pozivil (*Acta Montanistica Slovaca*, Rocnik 9 (2004), cislo 3, 258-260) reports transformation of the kinetic energy released in the gas expansion process into mechanical energy in an expansion turbine and, in most cases, subsequently into electrical power. This electrical power can then be used in a variety of ways: supplied back to the electricity grid; used to provide some or all of the electrical requirements of the site and possibly used to power a heat pump to supply heat to the expanded gas.

There are a number of issues to be addressed in considering the use of any of these power-generating methods. First is the fact that the gas temperature drop which accompanies a power-producing expansion is several times larger than that which accompanies a throttling expansion to the same final pressure. If this cooling is to be counteracted by burning gas upstream of the expander, the reheating process will consume more energy than can be generated even by the most efficient expander-generator unit. There must also be a full-time electrical load available to the station to utilise the electrical energy produced. In practical terms this usually means a grid connection through which the electricity is fed back into the network. In any case there is a net loss of usable energy even if the electricity generated is fully used. Justification for the expenditure for this arrangement must be sought from factors other than energy savings.

A variation of this approach is to use a CHP unit in addition to the expander-generator unit. The size of the CHP is determined by the amount of reheat required so that the thermal output of the CHP can be used to counteract the expansion-induced gas cooling. The electrical output of the expander-generator is added to that of the CHP unit and both are supplied to the grid. Both of the electrical outputs produce an economic return to the operator, but the primary energy and $CO_2$ advantages of the approach are less straightforward to establish. The reason for deploying the CHP unit is mainly to take advantage of its thermal output, so this part of the combustion energy must be seen as sacrificial in the overall scheme. The role of the CHP could be replaced by a fuel cell, and the overall approach would be the same.

If the heat is to be added post-expansion, then it will be necessary to add condensation inhibitors to the gas stream. Indeed, because of the very large temperature drop it may be necessary to increase the dosage of inhibitor for it to remain effective. It will also be necessary to evaluate the implications for equipment of chilling by temperature drops down to $-80°$ C. which can occur even in a single expansion stage. This method is capable of achieving significant primary energy savings, but its implementation presents in more extreme form all of the difficulties noted above in connection with the inhibitor addition method.

U.S. Pat. No. 5,628,191 communicates a system comprising a heat pump to heat the gas pre-expansion. Utilising the pre-expansion heat pump approach, one is faced with the problem of heating the gas up to temperatures as high as 80-90° C. from an inlet temperature typically of 5-10° C. so as to avoid the cooling problems discussed above (supra). Achieving the very high final temperatures is a Herculean challenge for any conventional heat pump to achieve. In addition, the necessity of achieving such a large temperature lift in a single pass will have a very deleterious effect on the heat pump efficiency. If the heat pump efficiency does not achieve a minimum threshold efficiency level, the process may still require supplementary (combustion) heating.

U.S. Patent Application Publication No. 2003/0172661 provides for use of multiple small-ratio expansion stages to restrict the temperature drops to a range which a heat pump could handle. Such an approach would entail much greater equipment cost and complexity, without any additional benefit. The above considerations taken together make it unlikely that conventional heat pumps can play any significant role in this particular application.

Notwithstanding the state of the art it would still be desirable to provide for a system that is capable of pre-heating a pressurised fluid to a sufficient extent such that upon fluid depressurisation the problems associated with cooling are avoided. It would be desirable that the system be energy efficient. Furthermore, a system capable of net power generation would also be desirable.

SUMMARY OF THE INVENTION

The present invention provides for a system to minimise the effects of expansion cooling of any fluid undergoing depressurisation in a continuous or near continuous process. The system may be utilised to recover energy released by the expansion of the fluid.

In particular, the present invention provides for a system utilised to mitigate expansion cooling in natural gas pipeline depressurisation processes. Advantageously, the system may provide for energy recovery during the process of expansion cooling the natural gas.

In one aspect the present invention provides for a system for depressurisation of a pressurised fluid in a pipeline comprising:
  at least one depressuriser for expanding the pressurised fluid in the pipeline to a lower pressure; and
  a transcritical heat pump for circulating a supercritical (refrigerant) fluid,
  wherein the supercritical fluid undergoes cooling so as to release heat for transmission to the pressurised fluid in the pipeline prior to at least one expansion of said pressurised fluid.

As will be appreciated by a person skilled in the art, upon cooling of the supercritical refrigerant fluid the temperature and pressure of the refrigerant fluid may fall below the critical temperature and critical pressure of the refrigerant fluid. As such the transcritical heat pump may also have a low pressure, low temperature side for circulating a refrigerant fluid at a temperature and pressure below its critical temperature and critical pressure. The transcritical heat pump may have:
  a high temperature, high pressure side for circulating a refrigerant fluid at a temperature and pressure above its critical temperature and critical pressure; and
  a low temperature, low pressure side for circulating a refrigerant fluid at a temperature and pressure below its critical temperature and critical pressure.

The transcritical heat pump may also be understood to comprise a heat rejection phase for transferring heat from the refrigerant fluid at a temperature and pressure above its critical temperature and critical pressure.

The system of the present invention may further comprise at least one heat exchanger for transmission of heat to the pressurised fluid in the pipeline.

The heat released by the supercritical fluid undergoing cooling may be transmitted directly to the pressurised fluid in the pipeline prior to at least one expansion of said pressurised fluid. For example, a refrigerant fluid may undergo heating and compression in the heat pump such that it becomes supercritical and may be directly conducted to the at least one heat exchanger for heating the pressurised fluid in the pipeline. The supercritical fluid may undergo cooling in the heat exchanger to heat the pressurised fluid in the pipeline.

Conversely, heat released by the supercritical fluid undergoing cooling may be transmitted indirectly to the pressurised fluid in the pipeline prior to at least one expansion of said pressurised fluid. For example, this may comprise a secondary heat transfer circuit, which is in turn coupled to the at least one heat exchanger for heating the pressurised fluid in the pipeline. The heated supercritical fluid may undergo cooling in a heat exchanger so as to transmit heat to the secondary heat transfer circuit, thereby heating a fluid (for example water) in the secondary heat transfer circuit. The heated fluid in the secondary heat transfer circuit may be conducted to the at least one heat exchanger for heating the pressurised fluid in the pipeline.

The system of the present invention may provide for indirect heating of the pressurised fluid in the pipeline by the supercritical fluid. Advantageously, the configuration for indirect heating of the pressurised fluid in the pipeline by the supercritical fluid can be built into standard heat pump packages. Installation of the transcritical heat pump comprising the associated heat exchangers would require only plumbing trade skills rather than transcritical refrigeration skills.

The system of the present invention does not preclude a depressurisation step prior to heating of the pressurised fluid by the heat exchanger. Provided the incoming gas temperature is high enough to allow a small degree of depressurisation, and or the extent of depressurisation is sufficiently small, problems associated with cooling, such as liquefaction or solidification, should be avoided.

The heated supercritical fluid may undergo cooling in the heat exchanger so as to heat the pressurised fluid in the pipeline prior to expanding said pressurised fluid.

As used herein the term "transcritical heat pump" relates to a heat pump in which a refrigerant fluid undergoes a transcritical cycle, i.e. the refrigerant fluid changes between supercritical and subcritical states. In the system of the present invention the supercritical fluid may undergo cooling as part of a transcritical cycle to release heat to the pressurised fluid in the pipeline.

Desirably, the system of the present invention operates without the requirement for extra consumables, for example condensation inhibitors, at the pressure reduction site. This eliminates the extra costs associated with metering the inhibitor into the pressurised fluid pipeline and recovering the inhibitor before the fluid is supplied to the end user.

The system of the present invention provides for high efficiency heating as a consequence of the ability of a transcritical heat pump to deliver heat over the long continuously descending temperature ramp of a cooling supercritical fluid (as opposed to the nearly isothermal heat delivery characteristic of condensation in the normal reverse Rankine cycle).

In the system of the present invention, the heat rejection process (in the heat exchanger of the transcritical heat pump) takes place at a pressure above the critical pressure of the supercritical fluid. Thus, enabling the supercritical fluid to reach considerably higher temperatures. In addition, the heat rejection process in a transcritical heat pump occurs over a wide temperature band rather than at a single condensing temperature. This enables highly efficient heating of a pressurised fluid in a pipeline, such that the temperature of the pressurised fluid can be raised sufficiently so as to mitigate the temperature drop associated with expansion cooling of the pressurised fluid.

The system of the present invention may be capable of supplying electrical energy to the site (i.e. back to the system). Energy released in the fluid expansion (depressurisation) step may be harnessed. The harnessed energy may be supplied back to the system of the present invention as a source of energy. For example, the transcritical heat pump of the system of the present invention may be powered by an energy generator. The energy generator may be driven by the energy released in the fluid expansion step.

The energy released by gas depressurisation may be directly coupled to a transcritical heat pump compressor. This arrangement may allow reductions in cost as it eliminates the requirement for an electric generator and associated equipment.

Alternatively, the system of the present invention may be adapted to supply energy external to the system, for example to supply electrical energy to a grid connection. The system of the present invention may be adapted to supply electrical energy back to the system of the present invention in addition to supplying electrical energy to a grid connection.

The transcritical heat pump of the present invention may be thermally coupled to an ambient heat source (through a heat exchanger). Heat from the ambient may be transferred to the refrigerant fluid directly or indirectly (similar to above).

Direct heating by the ambient may comprise direct heat transfer between the refrigerant fluid and the heat exchanger coupled to the ambient heat source. Indirect coupling to the ambient may be achieved through a secondary heat transfer circuit, which may be coupled to the ambient heat source heat exchanger, and which takes in heat from the ambient to in turn heat the refrigerant fluid. The ambient heat source may be selected from the group comprising air, ground, ground water, surface water or combinations thereof. This may allow for the intake of low temperature thermal energy by the heat pump. The ambient may provide heat to the refrigerant fluid when it is in a subcritical state.

The heat exchanger in communication with the pressurised fluid in the pipeline may be disposed in a contraflow arrangement to the pressurised fluid in a pipeline. This provides for more efficient heat rejection.

The refrigerant for the transcritical cycle may be a fluid with a critical temperature high enough to allow evaporation by boiling up to about 20-25° C. and low enough that standard refrigeration heat rejection temperatures 40-80° C. are above its critical temperature. The fluid should have a large heat of vaporisation. Desirably, the fluid will be miscible with oil so as to provide sufficient lubrication. As the skilled person will appreciate, any suitable fluid may be utilised. For example, the transcritical refrigerant may be selected from $CO_2$, $C_2H_6$, $N_2O$, $B_2H_6$, $C_2H_4$. The present invention also embraces combinations thereof. The fluid undergoing transcritical cooling may be $CO_2$. Advantageously, $CO_2$ is a non-flammable and non-toxic fluid. Further advantageously, $CO_2$ has an Ozone Depletion Potential (ODP) of zero and a Global Warming Potential (GWP) of one, making it one of the most attractive transcritical fluid options.

The depressuriser of the system of the present invention may comprise a throttling valve.

Desirably, the system of the present invention is configured to generate all of the energy required to heat the pressurised fluid, without burning any of said pressurised fluid in the heating process. For example, when the pressurised fluid is natural gas, without burning any of the natural gas. Such a system would be energy efficient.

The system may further comprise an energy generator for converting the energy released by the expanding fluid into electrical energy. Desirably, the pressurised fluid in the pipeline is heated by the heat exchanger prior to converting the energy released by the expanding fluid into electrical energy. Advantageously, by heating the pressurised fluid to a sufficiently high temperature the system of the present invention would eliminate consumption of the pressurised fluid, for example through burning, to counteract unwanted cooling arising from depressurisation.

The energy released by the expanding fluid may be transmitted to an energy generator. The energy generator may comprise a mechanical component driven by the expanding fluid to generate energy. For example, the pressurised fluid may be expanded through a turbine. In one desirable arrangement, the energy released by the expanding pressurised fluid may be harnessed by a turbo expander. Desirably, the pressurised fluid in the pipeline is heated (in a heat exchanger) prior to expanding the pressurised fluid through the energy generator.

The system of the present invention comprising an energy generator exploiting the fluid expansion process may provide for net power generation. The power-producing expander (for example, the turbo expander) can produce considerably more energy than that required to run the transcritical heat pump. Hence, the system of the present invention may be configured to produce a surplus of energy, a surplus of heat (for supply to the pressurised fluid in the pipeline) or a combination thereof.

The expansion of the pressurised fluid may be split between one or more depressurisers, for example a turbo expander and one or more Joule-Thompson throttling valves. Expander-generator units are more expensive than Joule-Thomson throttling valves and it may be more economic to split the expansion between an expander-generator unit and a number of Joule-Thomson throttling valves.

The system of the present invention may provide for a number of depressurisers in a series type arrangement. This may facilitate stepwise expansion of the pressurised fluid. Each depressuriser may expand the pressurised fluid through an energy generator so as to generate energy from each expansion. Alternatively, one of a plurality of depressurisers may expand the pressurised fluid through an energy generator. The remaining depressurisers may be throttling valves.

The system of the present invention may further comprise at least one of:

at least one depressuriser for expanding the pressurised fluid prior to heating of the pressurised fluid by the heat exchanger;

at least one depressuriser for expanding the pressurised fluid subsequent to a prior expansion of the heated pressurised fluid; and combinations thereof.

Incorporating, in the system of the present invention, a depressuriser for expanding the pressurised fluid prior to heating of the pressurised fluid by the heat exchanger may be beneficial to the overall process. A slight precooling of the pressurised fluid may allow for a lower gas inlet temperature to the heat exchanger on the gas line. This may have a positive effect on the coefficient of performance of the heat pump and may increase the efficiency of the heat pump.

A pre-expansion of the pressurised fluid may increase the total pressure drop that can be achieved in a single stage. Thus, it may increase the overall pressure reduction capability of the system of the present invention beyond the limit imposed by the maximum inlet/outlet pressure ratio of the expander-generator acting alone. Provided the incoming gas temperature is high enough to allow a small degree of depressurisation, problems associated with cooling, such as liquefaction or solidification, should be avoided.

Incorporating, in the system of the present invention, a depressuriser for expanding the pressurised fluid subsequent to a prior expansion of the heated pressurised fluid mitigates the ability of the heat pump to produce more heat than is required to counteract the cooling which results from the energy-producing gas expansion step. Thus, additional cooling may be provided by further depressurisation.

The system of the present invention may provide for a plurality of pressure reduction lines, optionally disposed in parallel to one another. Each pressure reduction line may comprise at least one heat exchanger. Alternatively, one heat exchanger may heat the pressurised fluid for subsequent distribution into each pressure reduction line. Each pressure reduction line may comprise a depressuriser. Each pressure reduction line may comprise at least one depressuriser.

Each pressure reduction line may comprise at least one depressuriser configured to expand the pressurised fluid through an energy generator (expander-generator). In a desirable arrangement, one pressure reduction line comprises an energy generator which may provide the energy needed to heat the fluid in each of the pressure reduction lines. For example, a single energy generator may provide energy to power a single heat pump or a plurality of heat pumps. The heat exchangers associated with the heat pumps may be disposed in the same pressure reduction line or in separate pressure reduction lines. Alternatively, a single energy generator may provide energy to power a single heat pump, the heat exchanger element of which heats the pressurised fluid prior to distribution of the pressurised fluid into each pressure reduction line.

Each pressure reduction line may be configured to expand the pressurised fluid to a different pressure. This may be particularly advantageous where the pressurised fluid, for example natural gas, is to be distributed to different end users via the different pressure reduction lines. Suitably, the system of the present invention may provide for 2 to 5 pressure reduction lines disposed in parallel to one another.

It will be appreciated that the pressurised fluid in the pipeline of the system of the present invention may be gaseous. The pressurised fluid may be natural gas.

In a further aspect, the present invention provides for use of a supercritical fluid in a heat pump for the transmission of heat to a pressurised fluid in a pipeline prior to depressurisation of the pressurised fluid. The supercritical fluid may undergo cooling in a heat rejection phase in a heat exchanger. The supercritical fluid may undergo cooling as part of a transcritical cycle to release heat to the pressurised fluid in the pipeline. The heat provided by cooling of the supercritical fluid may be transmitted to the pressurised fluid in the pipeline directly or indirectly. Direct heating may comprise direct heat transfer between the supercritical fluid and the pressurised fluid in the pipeline. Indirect heat transfer may be achieved through a secondary heat transfer circuit comprising a fluid (for example water), which is coupled to a heat exchanger for heating the pressurised fluid in the pipeline, and which is heated by the supercritical fluid undergoing cooling to in turn heat the pressurised fluid in the pipeline. The pressurised fluid in the pipeline may be natural gas.

In yet a further aspect, the present invention provides for a method for heating a pressurised fluid in a pipeline comprising:

providing a transcritical heat pump, and
cooling a supercritical fluid to release heat for transmission to the pressurised fluid in the pipeline.

The supercritical fluid may undergo cooling as part of a transcritical cycle to release heat to the pressurised fluid in the pipeline. The heat provided by cooling the supercritical fluid may be transmitted to the pressurised fluid in the pipeline directly or indirectly. Direct heat transfer may comprise direct transmission of heat from the supercritical fluid undergoing cooling and a heat exchanger in communication with the pressurised fluid in the pipeline. A transcritical heat pump may directly conduct the heated supercritical fluid to the heat exchanger.

Indirect heat transfer may be achieved through a secondary heat transfer circuit comprising a fluid (for example water), which is coupled to a heat exchanger for heating the pressurised fluid in the pipeline, and which is heated by the supercritical fluid undergoing transcritical cooling to in turn heat the pressurised fluid in the pipeline. The pressurised fluid in a pipeline may be natural gas.

The straightforward nature of the system of the present invention means that its operation should entail little if any change from existing arrangements for service and maintenance. The expected long service life and minimal service/adjustment requirements of the system give it excellent prospects for cost-effectiveness.

Where suitable, it will be appreciated that all optional and/or additional features of one embodiment of the invention may be combined with optional and/or additional features of another/other embodiment(s) of the invention.

BRIEF DESCRIPTION OF THE DRAWINGS

Additional features and advantages of the present invention are described in, and will be apparent from, the detailed description of the invention and from the drawings in which.

DETAILED DESCRIPTION OF THE INVENTION

It should be readily apparent to one of ordinary skill in the art that the examples disclosed herein below represent generalised examples only, and that other arrangements and methods capable of reproducing the invention are possible and are embraced by the present invention.

Figure 1:
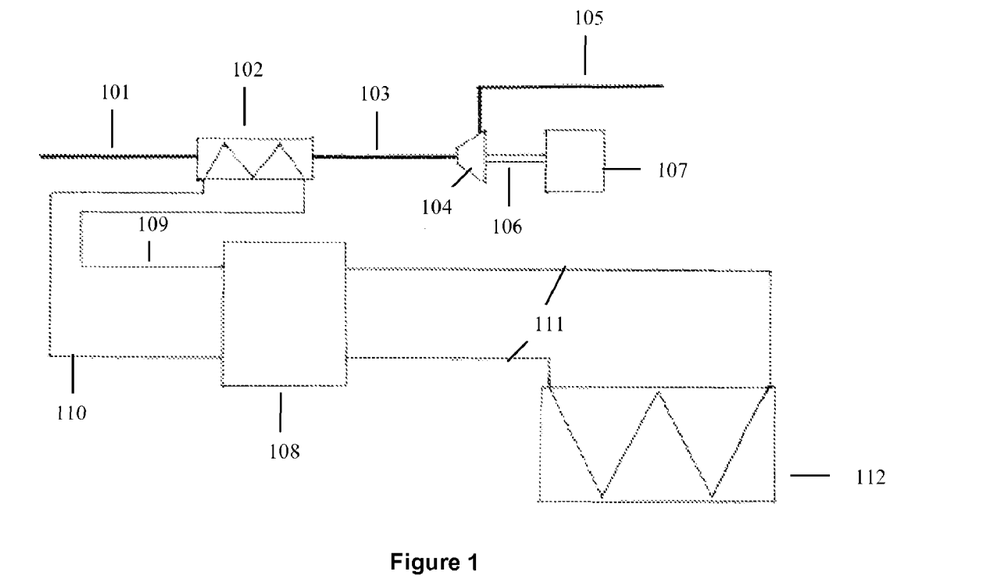
FIG. 1 illustrates a system according to the present invention comprising an energy generator.

The system of the present invention provides for a fluid expansion energy conversion device (typically a radial inflow expansion turbine coupled to an electrical generator) and an ambient source transcritical heat pump. The ambient heat may be sourced from at least one of water, air, or the ground. The configuration of the components for pressure reduction in a high pressure natural gas line assembly is shown in FIG. 1.

Incoming high pressure gas in pipe 101 is taken through a heat exchanger 102 in which it is heated, preferably in a counterflow arrangement, by refrigerant fluid undergoing transcritical cooling. The temperature of the gas emerging from the heat exchanger via pipe section 103 is maintained at a level high enough to prevent any low temperature problems after the expansion step.

The gas proceeds to enter the energy-producing gas expansion device 104, preferably a high efficiency radial inflow expansion turbine, in which the gas temperature drops back to a level close to that of the incoming high pressure gas. The pressure of the outgoing gas in pipe section 105 is lower than that of the entering gas 101 by the design pressure reduction ratio for the particular station. The gas then passes to further processing steps (which may comprise one or more further expansion steps) or to the distribution system for distribution to an end user. The gas expansion energy produced in the expander 104 is transmitted, from the expander 104, by a mechanical coupling 106 to a generator 107 where it is transformed into electricity.

All or a portion of the generated electricity is used to power a transcritical heat pump unit 108. The energy generator 107 may be directly connected (not shown) to the heat pump 108. The present disclosure incorporates a transcritical heat pump 108 in order to overcome several difficulties which render most heat pumps inefficient at or incapable of meeting the temperature demands of the application. In the transcritical cycle, the heat rejection process takes place at a pressure above the critical pressure of the refrigerant, thus enabling it to reach considerably higher temperatures. In addition, the heat rejection process in a transcritical heat pump occurs over a wide temperature band rather than at a single condensing temperature, making it particularly well suited to the current application.

The coefficient of performance (COP) of the transcritical process is determined by the average heat release temperature. This, in combination with the long continuously descending temperature ramp of a cooling supercritical fluid allows the transcritical heat pump to achieve very favourable COP values while supplying the high final gas temperatures required.

The heat pump 108, whose heat rejection component is the above-described heat exchanger 102, also comprises a compressor, an evaporator, an internal heat exchanger and other components required for the operation of the transcritical heat pump cycle. The compressor, heat exchangers, flow control devices and internal refrigerant circuit components may be any of the types used in the refrigeration/heat pump industry for transcritical systems. Hot high-pressure refrigerant fluid is carried to the heat exchanger 102 from the heat pump 108 by means of the heated refrigerant supply pipe 109. Cooled high-pressure refrigerant is returned to the heat pump 108 from the high temperature heat exchanger 102 by pipe 110. Optionally, the heat delivery loop comprising heat exchanger 102 and pipes 109 and 110 could circulate water or other suitable liquid instead of the refrigerant itself. The evaporator of the heat pump 108 is thermally coupled to the local ambient. It may be coupled to the air, the ground, a ground or surface water source, a waste heat stream or any combination of these elements. The ambient coupling heat exchange circuit 111 may either be direct (for example, circulating the system refrigerant throughout the heat-gathering circuit) or indirect (for example, using a freeze-protected liquid to collect ambient heat). The ambient coupling heat exchanger 112 may take a variety of forms depending on the specific type of heat exchange best suited to each site.

Energy to operate the system equipment, such as the compressor and other electrical peripherals in the heat pump is provided by the generator 107 (which is in turn coupled to the expander unit 104). The thermal energy is sourced from the ambient and raised in temperature by a transcritical heat pump to provide heat to the incoming gas prior to its expansion. The heat pump (including its ambient energy source) is sized to provide the necessary gas heating and not necessarily to fully exploit the available gas expansion energy.

The amount of heat which must be delivered to the gas stream by the heat exchanger 102 to counteract expansion cooling will be significantly greater than the amount of electrical energy generated by the generator 107. The efficiency of the expander 104, the generator 107 and the power conversion electronics will limit the power which can be supplied to the heat pump from gas expansion energy recovery. Even with well-adjusted contemporary equipment, the energy recovered as electricity is unlikely to exceed 75-80% of the available gas expansion energy.

Invariably, the above energy losses are not recoverable as usable heat for the gas warming task. Hence these energy losses must be supplied from the thermal output of the heat pump. In addition to making up these losses, it is necessary to supply heat to counteract the Joule-Thomson cooling which takes place even in the absence of any gas energy recovery. The performance of the heat pump therefore must exceed a minimum heating COP of approximately 2 in order to provide full temperature recovery of the incoming high temperature gas without the consumption of any gas (or other purchased fuel). The transcritical heat pump is uniquely able to meet this performance requirement while supplying the high temperatures and the high temperature lift needed for preheating.

Figure 2:
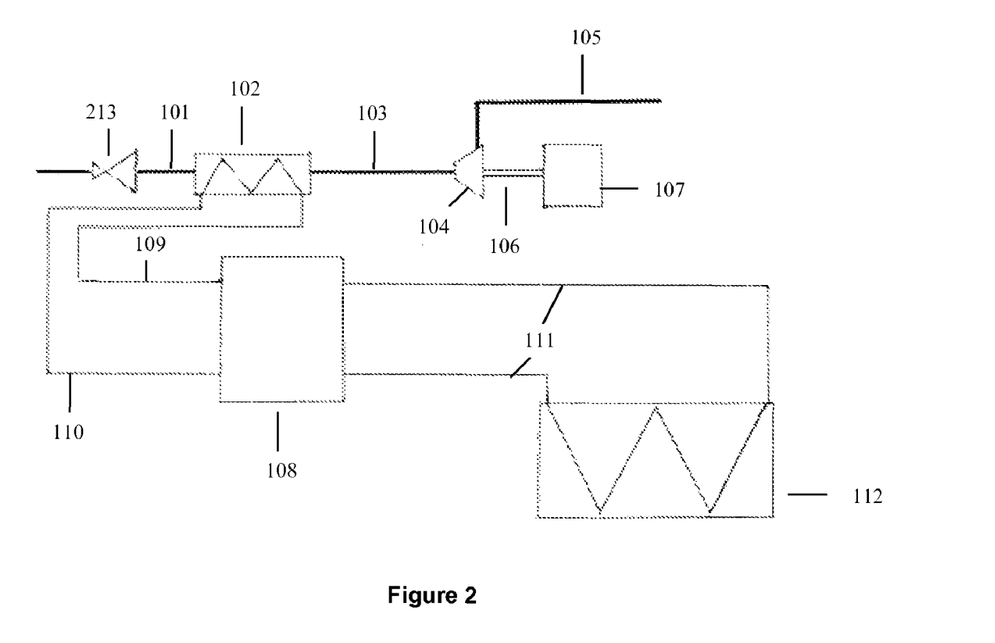
FIG. 2 illustrates a system according to the present invention comprising a throttling value for depressurisation of a pressurised fluid prior to heating.

In FIG. 2 the system includes an optional gas expansion step, using a throttling valve 213, located upstream of the heat exchanger 102 and the main expander 104. Provided the incoming gas temperature is high enough to allow a small degree of depressurisation, the liquefaction and solidification problems associated with cooling should be avoided. A mechanical coupling 106 connects the expander 104 to an energy generator 107. The energy generated by the generator 107 may be utilised to power the transcritical heat pump 108. The transcritical heat pump 108 is thermally coupled to the ambient through circuit 111 and heat exchanger 112. Pipe sections 109 and 110 connect the heat exchanger 102 to the transcritical heat pump 108. The pressure of the outgoing gas in pipe section 105 is lower than that of the entering gas 101. The gas then passes to further processing steps (which may comprise one or more further expansion steps) or to the distribution system for distribution to an end user.

The provision of an additional gas expansion step, via throttling valve 213, upstream of the heat exchanger 102 may be beneficial to the overall process in two different ways. Firstly, a slight precooling of the gas allows for a lower gas inlet temperature to the heat exchanger on the gas line 101. This has a positive effect on the coefficient of performance of the heat pump and increases the efficiency of the heat pump. Secondly, a pre-expansion of the gas increases the total pressure drop which can be achieved in a single stage and thereby increases the overall pressure reduction capability of the aggregate beyond the limit imposed by the maximum inlet/outlet pressure ratio of the expander acting alone.

Figure 3:
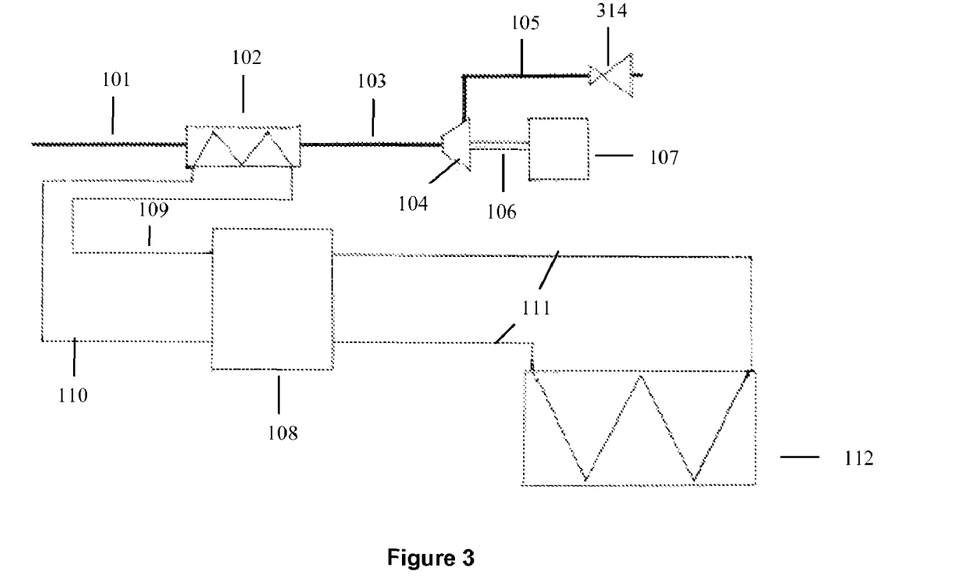
FIG. 3 illustrates a system according to the present invention wherein the pressurised fluid undergoes further expansion subsequent to a first energy generating expansion.

FIG. 3 illustrates a variation in which there is a pressure reduction step, through throttling valve 314, downstream of the energy-producing expansion process. A mechanical coupling 106 connects the expander 104 to an energy generator 107. The energy generated by the generator 107 may be utilised to power the transcritical heat pump 108. The transcritical heat pump 108 is thermally coupled to the ambient through circuit 111 and heat exchanger 112. Pipe sections 109 and 110 connect the heat exchanger 102 to the transcritical heat pump 108. The pressure of the outgoing gas in pipe section 105 is lower than that of the entering gas 101.

The variation illustrated in FIG. 3 mitigates the ability of the transcritical heat pump 108 to produce more heat than is required to counteract the cooling which results from the energy-producing gas expansion step through expander 104. The downstream pressure reduction step is achieved through the use of conventional throttling equipment 314 and will be accompanied by Joule-Thomson cooling. The size of the second pressure reduction step whose associated chilling can be counteracted by the excess heat supplied by the heat pump will be limited by the heat pump efficiency achievable at each individual site. The gas may then pass to further processing steps (which may comprise one or more further expansion steps) or to the distribution system for distribution to an end user.

In favourable circumstances the second pressure reduction ratio, via throttling valve 314, can be as large as the first (energy-recuperative) pressure reduction ratio. This may provide for a two-stage pressure reduction in which the entire reheating requirement can be supplied by a single expander-generator heat pump assembly.

Figure 4:
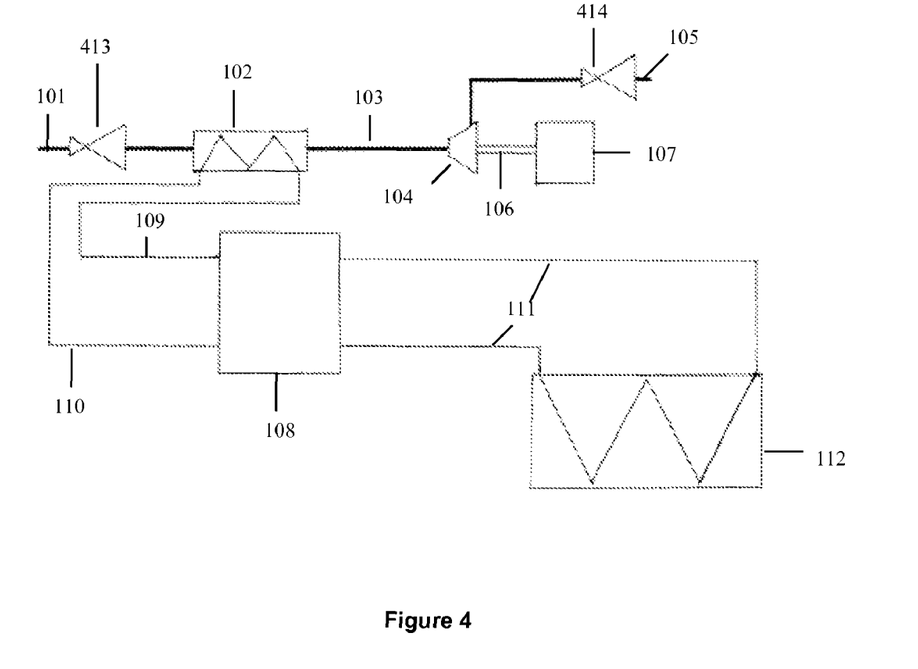
FIG. 4 illustrates a system according to the present invention wherein the pressurised fluid undergoes depressurisation at a number of locations.

A system having throttling expansion steps included both upstream, via throttling valve 413, and downstream, via throttling valve 414, of the power-producing expander 104 is provided in FIG. 4. A mechanical coupling 106 connects the expander 104 to an energy generator 107. The energy generated by the generator 107 may be utilised to power the transcritical heat pump 108. The transcritical heat pump 108 is thermally coupled to the ambient through circuit 111 and heat exchanger 112. Pipe sections 109 and 110 connect the heat exchanger 102 to the transcritical heat pump 108. The pressure of the outgoing gas in pipe section 105 is lower than that of the entering gas 101. The gas then passes to further processing steps (which may comprise one or more further expansion steps) or to the distribution system for distribution to an end user.

This arrangement depicted in FIG. 4 allows the system to be optimised for maximum heat pump COP while producing a larger pressure reduction than can be achieved in a single power-producing stage.

Figure 5:
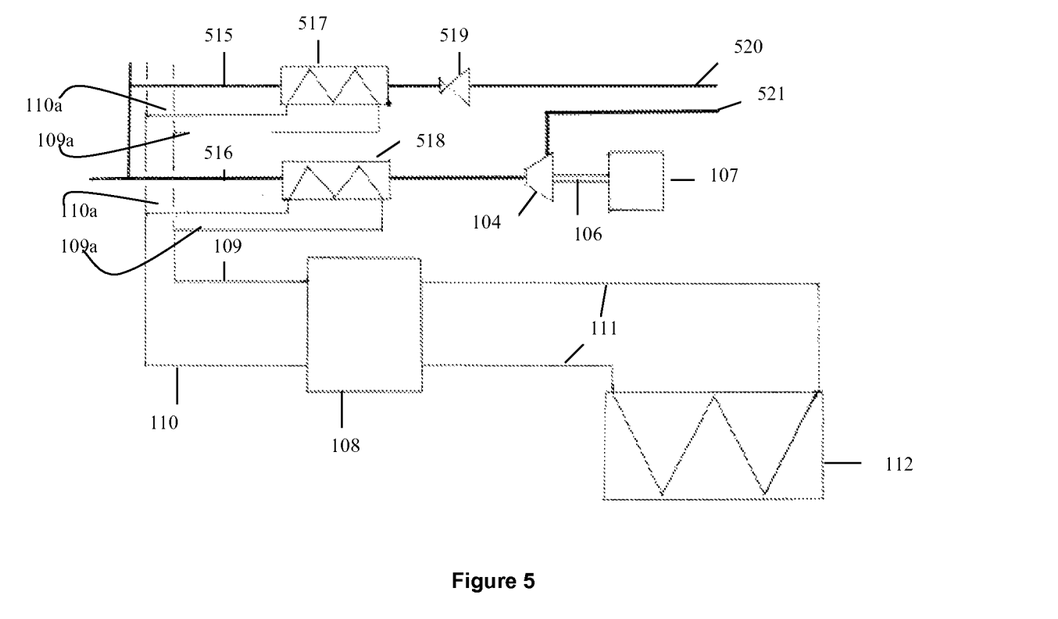
FIG. 5 illustrates a system according to the present invention having two pressure reduction lines in parallel.

In FIG. 5 there are two pressure reduction lines 515 and 516 in parallel. Each pressure reduction line 515 and 516 has a heat exchanger 517 and 518. Heated supercritical fluid is conducted to the heat exchangers 517 and 518 in pipe sections 109 and 109a by transcritical heat pump 108. Cooled fluid returns to the pump in pipes 110 and 110a. The transcritical heat pump 108 is thermally coupled to the ambient through circuit 111 and heat exchanger 112. As will be appreciated, the system may comprise a number of pressure reduction lines in parallel. Each pressure reduction line may comprise an energy producing expander. Each pressure reduction line may comprise a throttling valve. Each of the plurality of pressure reduction lines may comprise either an energy producing expander or a throttling valve (depending on the needs of the system).

Pressure reduction line 516 comprises an energy-producing expander 104, and the energy released is harnessed by a mechanical coupling 106 to an energy generator 107. The pressure of the outgoing gas in pipe 521 is lower than that of the gas in pipe 516. The gas then passes to further processing steps (which may comprise one or more further expansion steps) or to the distribution system for distribution to an end user.

Pressure reduction line 515 comprises a throttling valve 519. The energy released during depressurisation is not harnessed by an energy generator. The pressure of the outgoing gas in pipe section 520 is lower than that of the gas in pipe 515. The gas then passes to further processing steps (which may comprise one or more further expansion steps) or to the distribution system for distribution to an end user. The energy required to heat the gas in the pressure reduction lines 515 and 516 can be provided by the transcritical heat pump 108, which in turn may be powered by the energy-producing expander 104.

Each pressure reduction line 515 and 516 may be configured to expand the pressurised gas to a different pressure. This may be particularly advantageous where the natural gas is to be distributed to different networks or end users via the different pressure reduction lines 515 and 516.

In each of FIGS. 1 to 5 discussed above it will be appreciated that electrical energy in excess of that required to operate the transcritical heat pump 108 may be supplied by the generator 107. In such a circumstance, the primary requirement is that the expander 104-generator 107 unit is selected to make full use of the recoverable expansion energy while the heat pump 108 is designed to deliver no more than the minimum reheat needed and to use the minimum of input in the process. Provided that there is a useful load (for example, a grid connect, lighting, controls, instrumentation and communications equipment, battery banks, pumps, and other peripherals to the site services) which can always accept the generated electrical energy, this option offers a means of recovering the maximum amount of energy available in the pressure reduction process. To implement this option there need only be one or more additional outputs from the generator. For example, one or more extra connections to the generator electrical terminals and a capability within the system controller to manage the electrical power delivery from the generator may be provided.

Figure 6:
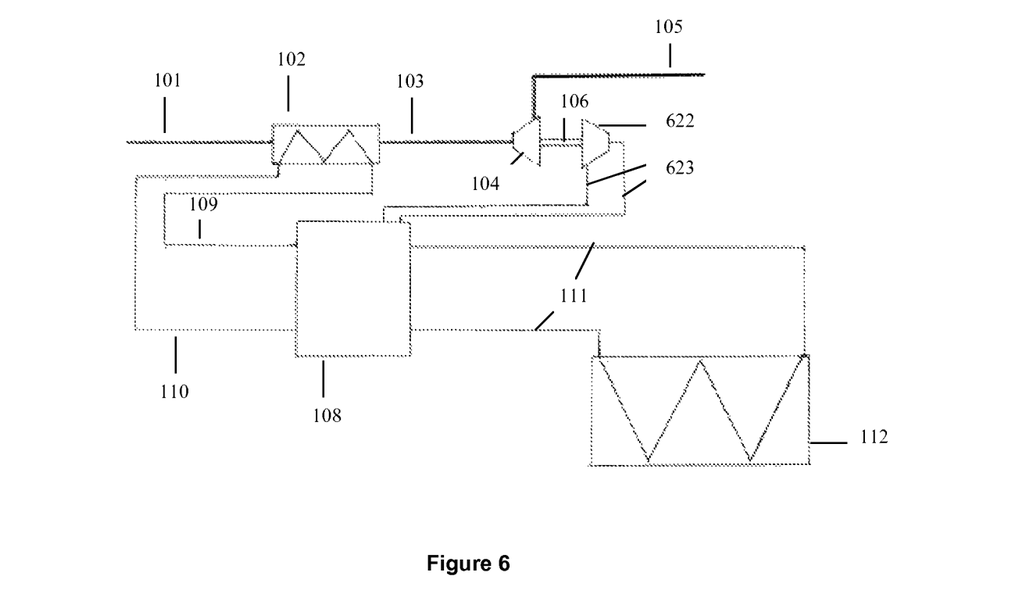
FIG. 6 illustrates a system according to the present invention having a mechanical coupling directly coupled to the transcritical heat pump.

In FIG. 6 the mechanical power generated by gas depressurisation is coupled directly to a compressor 622. The compressor 622 is connected to the transcritical heat pump 108 through circuit 623. A mechanical coupling 106 connected to the expander 104 powers the compressor 622. The transcritical heat pump 108 is thermally coupled to the ambient through circuit 111 and heat exchanger 112. Pipes 109 and 110 connect the heat exchanger 102 to the transcritical heat pump 108. The pressure of the outgoing gas in pipe 105 is lower than that of the entering gas 101. The gas then passes to further processing steps (which may comprise one or more further expansion steps) or to the distribution system for distribution to an end user.

The configuration illustrated in FIG. 6 comprising a compressor 622 directly coupled to expander 104 (via mechanical coupling 106) precludes generation of surplus electricity, but it achieves a higher energy efficiency and eliminates the need for an electric generator, a power conversion package and a electric compressor driver. This arrangement allows reductions in cost and is more readily adapted to close coupled systems which can be pre-manufactured, particularly for smaller applications where the generation and export of surplus electricity is unlikely to be economically feasible.

Figure 7:
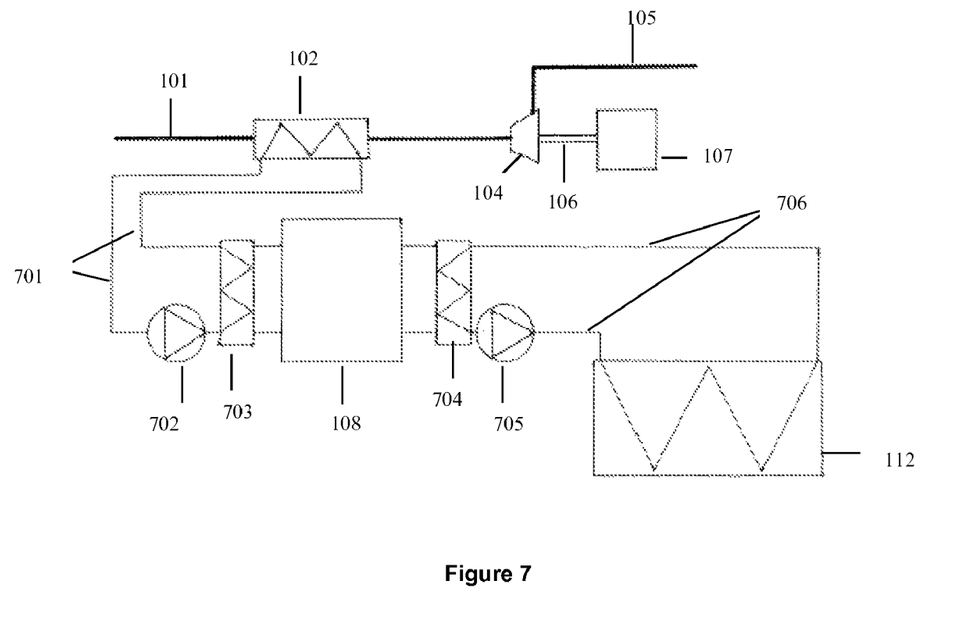
FIG. 7 illustrates a system according to the present invention comprising secondary heat exchange circuits.

In FIG. 7 the heat generated by the cooling supercritical fluid is transferred to the pressurised fluid in the pipeline 101 by means of a secondary heat exchange fluid circuit 701 in communication with heat exchanger 102. The secondary heat exchange fluid circuit 701 is powered by a pump 702, making the secondary heat exchange fluid circuit 701 separate from the transcritical heat pump 108. Heat transfer between the heated supercritical fluid and secondary heat exchange fluid circuit 701 occurs in heat exchanger 703. Typically, the secondary heat exchange fluid in the circuit 701 would be water. The water may contain a small fraction of antifreeze added to protect the system in the event of a shutdown.

A further secondary heat exchange circuit 706 is provided in FIG. 7. Circuit 706 runs between heat exchanger 704 and the ambient source heat exchanger 112. The secondary heat exchange fluid circuit 706 is powered by a pump 705, making the secondary heat exchange fluid circuit 706 separate from the transcritical heat pump 108. Heat from the ambient is transferred to secondary heat exchange circuit 706 in ambient heat exchanger 112. The heat is subsequently transferred to the cooled refrigerant fluid in heat exchanger 704. The fluid utilised in secondary heat exchange circuit 706 would require substantial freeze protection since it could operate near or below zero degrees Celsius.

A mechanical coupling 106 connects the expander 104 to an energy generator 107. The energy generated by the generator 107 may be utilised to power the transcritical heat pump 108 and or pumps 702 and 705. The pressure of the outgoing gas in pipe section 105 is lower than that of the entering gas 101.

Advantageously, the configuration illustrated in FIG. 7 can be built into packages similar to those used with existing non-transcritical heat pumps. Installation of transcritical heat pump 108 packaged together with associated heat exchangers 703 and 704 would require only plumbing trade skills rather than transcritical refrigeration skills.

It will be appreciated that each of the embodiments disclosed in the above Figures (supra) may be used one or more times, for example two or more systems in series or series/parallel arrays to achieve the gas heating and power production tasks needed at any single site.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A system for depressurisation of a pressurised fluid in a pipeline comprising:
   at least one depressuriser for expanding the pressurised fluid in the pipeline to a lower pressure;
   a transcritical heat pump for circulating a supercritical fluid,
   wherein the supercritical fluid undergoes cooling so as to release heat for transmission to the pressurised fluid in the pipeline prior to at least one expansion of said pressurised fluid; and
   wherein at least one secondary heat transfer circuit transmits heat from the supercritical fluid undergoing cooling to the pressurised fluid in the pipeline.

2. A system according to claim 1 further comprising at least one heat exchanger for transmission of heat to the pressurised fluid in the pipeline.

3. A system according to claim 2 wherein the heat exchanger is disposed in a contraflow arrangement to the pressurised fluid in the pipeline.

4. A system according to claim 2 further comprising at least one of:
   at least one depressuriser for expanding the pressurised fluid prior to heating of the pressurised fluid by the heat exchanger;
   at least one depressuriser for expanding the pressurised fluid subsequent to a prior expansion of the heated pressurised fluid; and
   combinations thereof.

5. A system according to claim 1 further comprising an energy generator for converting the energy released by the expanding fluid into electrical energy.

6. A system according to claim 5 wherein the transcritical heat pump is powered by the energy generator.

7. A system according to claim 5 wherein the energy released by the expanding gas is transmitted via a mechanical coupling to the generator.

8. A system according to claim 1 wherein the transcritical heat pump is thermally coupled to an ambient heat source.

9. A system according to claim 1 wherein the supercritical fluid undergoing cooling is selected from $CO_2$, $C_2H_6$, $N_2O$, $B_2H_6$, $C_2H_4$ and combinations thereof.

10. A system according to claim 1 wherein the pressurised fluid in the pipeline is natural gas.

11. A system according to claim 1 further comprising a plurality of pressure reduction lines wherein each pressure reduction line is configured to expand the pressurised fluid to a different pressure.

12. A method for heating a pressurised fluid in a pipeline comprising the steps of:
    providing a transcritical heat pump;
    providing at least one secondary heat transfer circuit for the transmission of heat from the supercritical fluid undergoing cooling to the pressurised fluid in the pipeline; and
    cooling a supercritical fluid to release heat for transmission to the pressurised fluid in the pipeline.

13. A method according to claim 12 wherein the pressurised fluid in the pipeline is natural gas.

14. A system for depressurisation of a pressurised fluid in a pipeline comprising:
    at least one depressuriser for expanding the pressurised fluid in the pipeline to a lower pressure;
    a transcritical heat pump for circulating a supercritical fluid, wherein the supercritical fluid undergoes cooling so as to release heat for transmission to the pressurised fluid in the pipeline prior to at least one expansion of said pressurised fluid; and
    further comprising at least one of:
    at least one depressuriser for expanding the pressurised fluid prior to heating of the pressurised fluid by a heat exchanger;
    at least one depressuriser for expanding the pressurised fluid subsequent to a prior expansion of the heated pressurised fluid; and
    combinations thereof.

15. A system according to claim 14 wherein at least one secondary heat transfer circuit transmits heat from the supercritical fluid undergoing cooling to the pressurised fluid in the pipeline.

16. A system according to claim 14 further comprising an energy generator for converting the energy released by the expanding fluid into electrical energy.

17. A system according to claim 14 wherein the heat exchanger is disposed in a contraflow arrangement to the pressurised fluid in the pipeline.

18. A system according to claim 14 wherein the supercritical fluid undergoing cooling is selected from $CO_2$, $C_2H_6$, $N_2O$, $B_2H_6$, $C_2H_4$ and combinations thereof.

19. A system according to claim 14 further comprising a plurality of pressure reduction lines wherein each pressure reduction line is configured to expand the pressurised fluid to a different pressure.

20. A system according to claim 14 wherein the pressurised fluid in the pipeline is natural gas.

* * * * *